United States Patent [19]
Even

[11] Patent Number: 6,016,622
[45] Date of Patent: Jan. 25, 2000

[54] FISHING DIVER WITH SLIDE THROUGH LINE AND PROTECTIVE FLEXIBLE SLEEVE THEREFOR

[76] Inventor: Randy P. Even, 4226 S. 13th St., Sheboygan, Wis. 53081

[21] Appl. No.: 09/193,449

[22] Filed: Nov. 17, 1998

[51] Int. Cl.[7] .................................................. A01K 95/00
[52] U.S. Cl. ........................................................... 43/43.13
[58] Field of Search ............................... 43/44.87, 44.88, 43/44.89, 44.92, 44.95, 57.3, 43.13

[56] References Cited

U.S. PATENT DOCUMENTS

| | | |
|---|---|---|
| 1,670,184 | 5/1928 | Bond . |
| 2,052,262 | 8/1936 | Walberg . |
| 2,247,583 | 7/1941 | Louthan . |
| 2,273,209 | 2/1942 | Louthan . |
| 3,181,266 | 5/1965 | Leufvenius . |
| 3,524,277 | 8/1970 | Heubert . |
| 3,643,370 | 2/1972 | Cook et al. . |
| 3,755,955 | 9/1973 | Saia . |
| 3,813,809 | 6/1974 | Frotiee . |
| 3,844,059 | 10/1974 | Weber . |
| 3,898,759 | 8/1975 | Jensen . |
| 3,940,872 | 3/1976 | Weber . |
| 4,320,592 | 3/1982 | Kirsch . |
| 4,567,687 | 2/1986 | Even et al. . |
| 4,581,842 | 4/1986 | Kalberer ................................. 43/43.13 |
| 5,339,561 | 8/1994 | Weber ................................... 43/43.13 |

*Primary Examiner*—Jack W. Lavinder
*Attorney, Agent, or Firm*—Andrus, Sceales, Starke & Sawall

[57] ABSTRACT

A fishing diver is provided by a diving planer with releasable latch member having a latched condition clamping the diving plane to the line such that upon trolling the diver dives downwardly at an angle to the trolling line, and having a released condition responsive to the strike of a fish unclamping the diving plane from the line and providing free sliding passage of the line through guide structure along the plane of the diving plane. The diver includes a spring sleeve arrangement for protecting the trolling end of the line as it passes through an eyelet on the latch member.

19 Claims, 3 Drawing Sheets

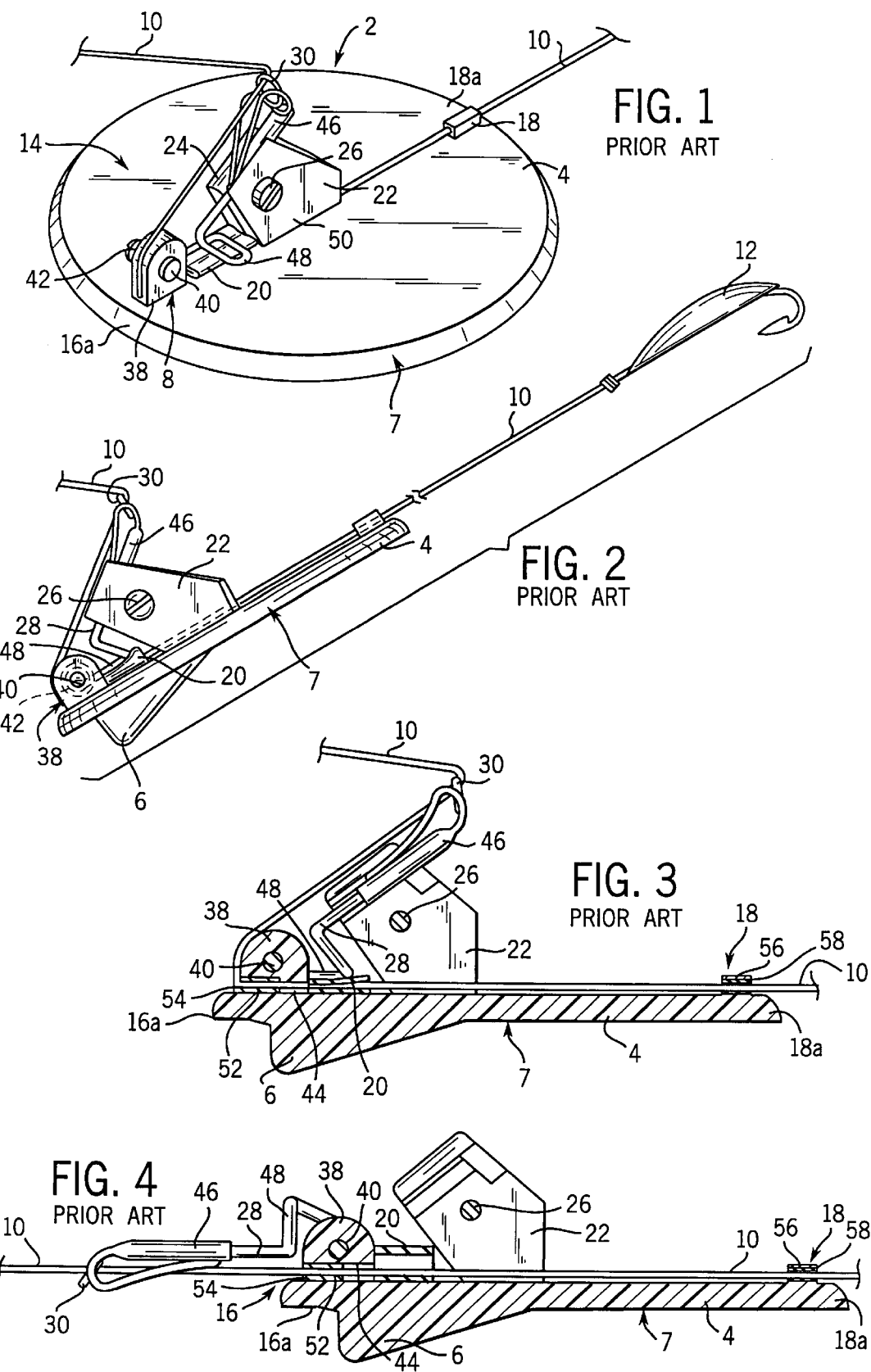

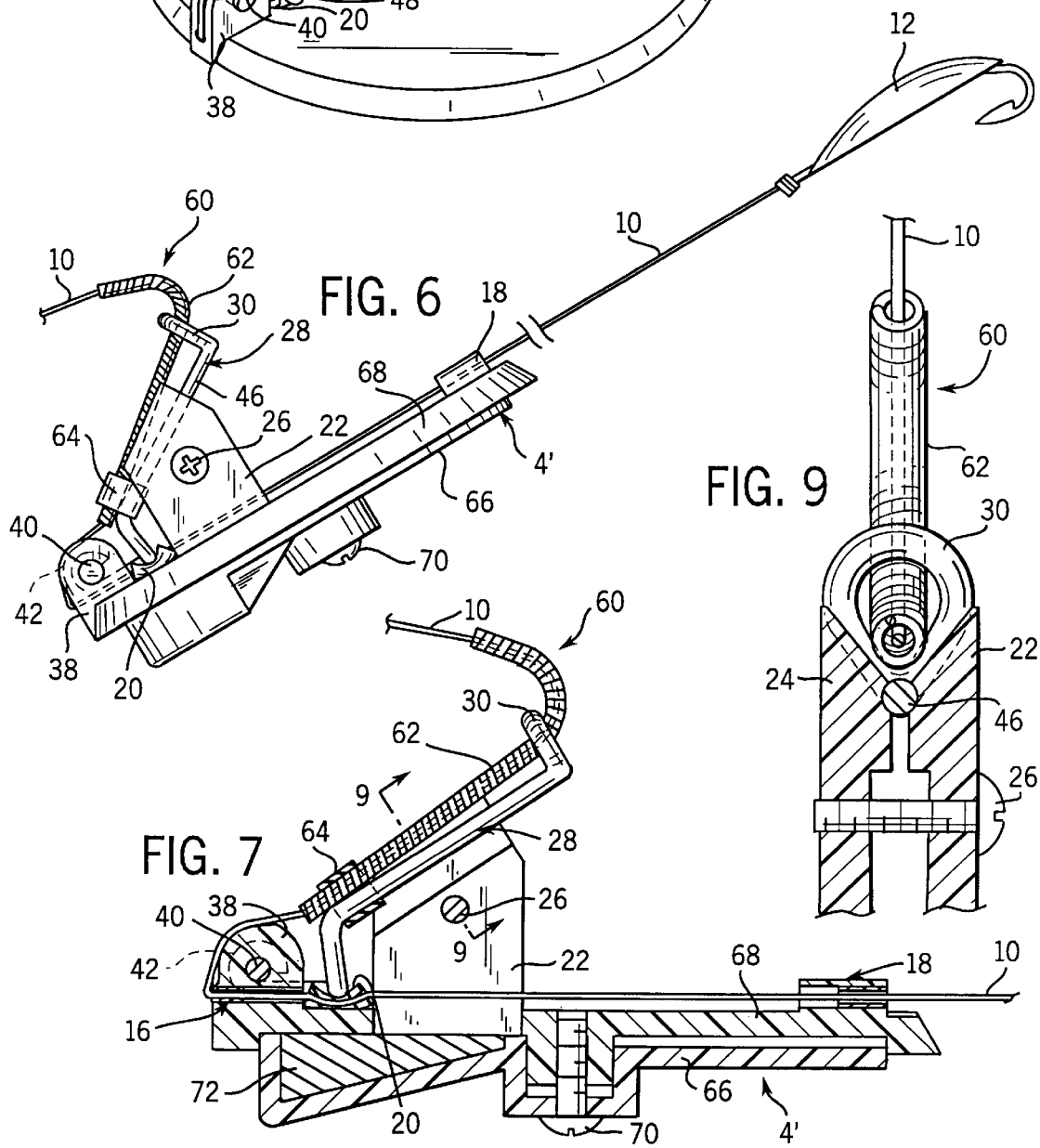

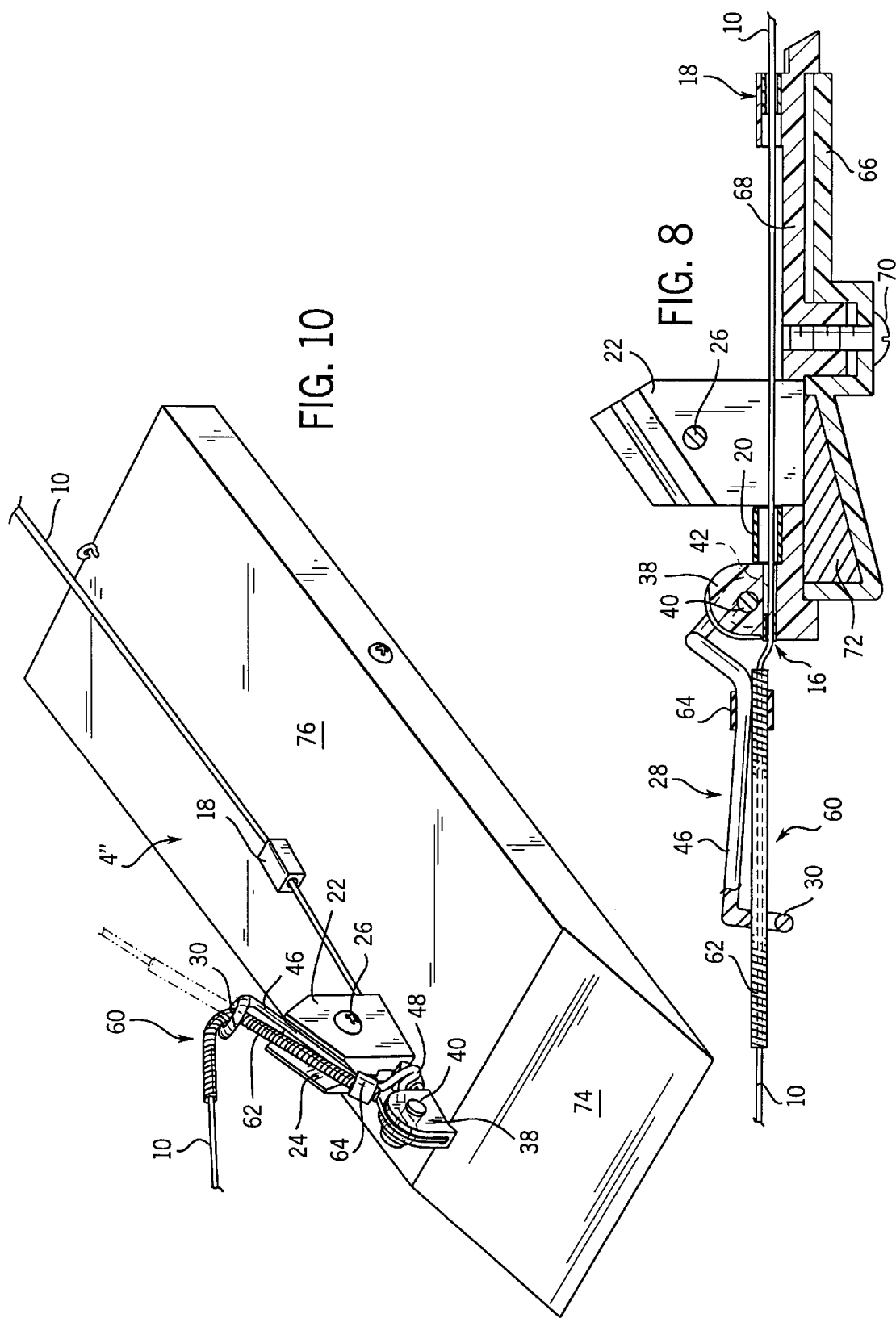

FISHING DIVER WITH SLIDE THROUGH LINE AND PROTECTIVE FLEXIBLE SLEEVE THEREFOR

BACKGROUND AND SUMMARY OF THE INVENTION

The invention relates to a fishing diver or sinker for carrying bait or a lure down to deeper depths when trolling.

The invention provides a diver which is clamped to a fishing line extending therethrough. In the latched condition, the diver is locked onto the line. In the unlatched condition, the diver may freely slide along the line. When the fish bites, the latch trips, and the line slides freely through the diver, whereby the fish need not pull the diver along with it, which otherwise may result in increased line breakage.

The line length between the diver and the fish is adjustable, which may be desirable for differing locales or for certain types of fish. Regardless of the line length between the diver and the fish, when the fish bites and the latch is released, the fish is directly reeled in and netted because the trolling line extends through the diver and is also the baiting line. In contrast, if a first trolling line is tied to the front of the diver, and a second separate baiting line is tied to the rear of the diver, the length of the baiting line cannot be greater than the length of the fishing pole, otherwise the fish cannot be netted when reeled all the way in. This maximum limit on the length of the bait line may be undesirable.

The present invention relates to an improvement in U.S. Pat. No. 4,567,687 issued Feb. 4, 1986, the disclosure of which is hereby incorporated by reference. In that patent, the fishing line extends contiguously along the planar surface of a diving plane. In the released condition, the diving plane slides freely along the line in the trolling direction, minimizing drag and line breakage. The diving plane has an upstanding fin extending rearwardly, with the fishing line being guided rearwardly through the base of the fin along the diving plane. Releasable latch means on the diving plane has a latched condition clamping the diving plane to the line, and a released condition responsive to the strike of a fish unclamping the diving plane from the line and enabling the diving plane to slide along the line in the trolling direction with the line sliding freely through the base of the fin. The line extends rectilinearly along the top planar surface of the diving plane between front and rear guide members in each of the latched and released conditions.

The invention set forth in the '687 patent further provides extended line life because the line is not pulled away from friction grip jaws or the like in a ripping or frictionally releasing type manner. Instead, a latch arm, for example made of steel or the like, is subjected to frictional clamping and unclamping wear and tear with frictional jaws, whereby to substantially diminish the line breakage by saving the line from undergoing such stress.

The above-described '687 patent generally provides an effective fishing diver designed in several areas to reduce stress on the fishing line. However, it has been discovered that the point of contact between the fishing line and the eyelet on the distal end of the latch arm is so small in surface area so as to create a particularly susceptible contact point where line breakage may occur. As a result, it is desirable to provide an improved fishing diver wherein the trolling or reel end of the fishing line will continuously engage an increased surface area at the latch arm eyelet so as to further minimize line breakage in both the latched and unlatched or released positions of the latch arm.

It is an object of the present invention to provide a fishing diver having a protective, flexible sleeve which surrounds a portion of the fishing line in a manner which will minimize line breakage. It is a further object of the present invention to provide an improved fishing diver which allows a prior art fishing diver to be easily modified or retrofit with a line protecting sleeve. Another object of the present invention is to provide a fishing diver provided with an enhanced latch arrangement which is secured to variously-shaped diving planes. It is also an object of the present invention to provide a fishing diver which is economical to manufacture and operates generally similarly to prior art fishing divers.

In one aspect of the invention, a fishing diver includes a diving plane, and guide structure on the diving plane for guiding a fishing line along the plane of the diving plane through the guide structure. One end of the line extends to a baiting lure and the other end of the line is reelable for trolling. The fishing diver also includes a releasable latch arm on the diving plane having a latched condition clamping the diving plane to the line such that upon trolling the diver dives downwardly at an angle to the trolling line. The latch arm also has a released condition responsive to the strike of fish on the lure unclamping the diving plane from the line and providing free sliding passage of the line through the guide structure along the plane of the diving plane, the line through the guide structure extending substantially parallel to the plane of the diving plane in the released condition of the latch arm. The latch arm includes an eyelet guiding the other end of the line therethrough and then forwardly through the guide structure. The invention is improved by means of an arrangement for protecting the other end of the line as it passes through the eyelet whereby to minimize breakage of the line thereat. In the preferred embodiment, the arrangement is embodied in a deformable sleeve surrounding the line in the vicinity of the eyelet, the sleeve being defined by an elongated coil spring having one end attached to the latch arm. In the latched condition, the other end of the line is engaged against an inner surface of the spring, and in the released condition, the other end of the spring is disengaged from the inner surface of the spring. The diving plane has a circular or rectangular profile and may take the form of a trolling planer.

In another aspect of the invention, a fishing diver includes a diving plane and guiding structure on the diving plane for guiding a fishing line. One end of the line extends to a baiting lure of the leg and the other end of the line is reelable for trolling or the like. The fishing diver includes a releasable latch member on the diving plane having a latched condition virtually engaged with latching structure on the diving plane at a first portion of the latch member and clamping the diving plane to the line at a second portion of the latch member such that upon trolling the diver dives downwardly at an angle to the trolling line. Latch member has a released condition responsive to the strike of a fish on the lure unclamping the first portion of the latch member from the latching structure to unclamp the diving plane from the line at the second portion of the latch member and provide free sliding passage of the line through the guide structure. A strike of the fish causes frictional unclamping of the first portion of the latch member such that the first portion of the latch member suffers frictional clamping and unclamping wear and tear. The invention is improved by a spring sleeve surrounding the other end of the line as the line runs upwardly and rearwardly along the first portion of the latch member, through and against a portion of the eyelet, and then forwardly and upwardly for a predetermined distance relative to the eyelet. In the latched condition, the sleeve spring assumes a curved formation around the eyelet and, in the released condition, the spring sleeve assumes a straight formation such that a longitudinal axis of the spring sleeve is substantially parallel to a top surface of the diving plane.

In yet another aspect of the invention, a fishing diver includes a diving plane having a forward end and a rearward end, and guide structure on the diving plane for guiding a fishing line, one end of the line extending to a baiting lure or the like and the other end of the line being reelable for trolling. The diver includes a releasable latch member on the diving plane having a latched condition clamping the diving plane to the line such that upon trolling the diver dives from downwardly at an angle to the trolling line. The latch member has a released condition responsive to the strike of a fish on the lure unclamping the diving plane from the line and enabling the diving plane to slide along the line in the trolling direction. The latch member includes a pivoted latch arm, a front upstanding tab on the forward end of the diving plane pivotally mounting the latch arm and also guiding the line rearwardly through the tab. The latch arm has an eyelet at the end thereof opposite the front tab, the line extending through the eyelet then through the front tab. A protective sleeve in the form of an elongated coil spring encircles the line and extends rearwardly of the front tab, and then through and beyond the eyelet such that an inside surface of the spring provides an increased surface area for the line in the vicinity of the eyelet whereby to minimize the line breakage. The spring extends alongside the latch arm in both the latched and released conditions. The latch member includes a pair of gripper jaws on the forward end of the diving plane. One end of the spring is secured to the latch arm at a point between the front tab and the gripper jaws by a resiliently collapsible tubular member. The latch arm in the latched condition is pivoted rearwardly and frictionally held by the gripper jaws along a central portion of the latch arm between the eyelet end and the pivotally mounted end. The latch arm includes a line clamping portion coacting in the latched condition with the line gripper structure between a base of the gripper jaws and the front tab to clamp the diving plane to the line. The diving plane may have a circular or rectangular profile, the latter being a trolling planer having a ramped portion and a planar mounting portion for mounting the latched member thereon.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a top perspective view of a prior art fishing diver constructed in accordance with the invention.

FIG. 2 is a side elevational view of the prior art diver of FIG. 1.

FIG. 3 is a cross-sectional view of the prior art diver of FIGS. 1 and 2.

FIG. 4 is a view like FIG. 3 but showing a released condition of the prior art diver.

FIG. 5 is a top perspective view of a first alternative embodiment of the fishing diver in a latched condition in which the fishing line is provided with a protective, spring sleeve.

FIG. 6 is a side elevational view of the diver shown in FIG. 5.

FIG. 7 is a cross-sectional view of the diver of FIGS. 5 and 6.

FIG. 8 is a view like FIG. 7 but showing the diver in a released condition.

FIG. 9 is a cross-sectional view taken on line 9—9 of FIG. 7.

FIG. 10 is a top perspective view of a second alternative embodiment of the fishing diver.

DETAILED DESCRIPTION OF THE INVENTION

FIG. 1 shows a prior art fishing diver 2 in accordance with the aforementioned U.S. Pat. No. 4,567,687, comprising a circular diving plane 4 which may be forwardly weighted at 6 in an integral base 7, FIG. 2. Guide means 8 on the diving plane guides a fishing line 10 along the plane of diving plane 4. One end of line 10, for example the right end, extends to a baiting lure or the like 12, and the other end of the line, for example the left end of line 10, is reelable, such as from a fishing pole, for trolling or the like. Releasable latch means 14 on diving plane 4 has a latched condition, FIGS. 1–3, clamping diving plane 4 to line 10 such that upon trolling the diver dives downwardly, FIG. 2, at an angle to the trolling line, left end of 10. Latch means 14 has a released condition, FIG. 4, responsive to the strike of a fish on lure 12 unclamping diving plane 4 from the line and enabling free sliding passage of line 10 through guide means 8 along the plane of diving plane 4. Line 10 extends contiguously along the top planar surface of diving plane 4 in both the latched and released conditions of latch means 14.

Guide means 8 includes front and rear guide members 16 and 18 located on front and rear ends 16a, 18a, respectively, on the top planar surface of diving plane 4. Line 10 extends through and rectilinearly between front and rear guide members 16 and 18 in each of the latched and released conditions of latch means 14. Latch means 14 includes gripper means 20 for gripping line 10 between front and rear guide members 16 and 18 to clamp diving plane 4 to line 10. In one form, gripper means 20 is a resiliently collapsible tubular member, for example soft rubber. Line 10 extends through the tubular member 20 and is gripped by and clamped between opposing inner surfaces of tubular member 20 in the latched condition.

Latch means 14 includes friction grip jaw means located on the front end 16a of the diving plane 4 provided by a pair of upstanding jaws 22 and 24 spaced by a gap adjusted by screw 26. Diving plane 4 and upstanding jaws 22 and 24 are typically made of plastic and integrally molded. A pivoted latch arm 28 has a latched position frictionally engaged between and held by jaws 22 and 24 and including an eyelet 30 guiding line 10 therethrough then forwardly, FIGS. 1–3, to front guide member 16. Latch arm 28 in the latched position, FIGS. 1–3, coacts with line gripper means 20 to clamp diving plane 4 to line 10. Latch arm 28 is frictionally released from jaws 22 and 24 upon the strike of a fish on lure 12. Turning of screw 26 clockwise, FIG. 1, will increase the frictional gripping of latch arm 28 by jaws 22 and 24, which in turn requires a larger fish before jaws 22 and 24 release latch arm 28 to a released unlatched condition. The latch arm 28 in the released position unclamps gripper means 20 and line 10. In the released position of latch arm 28, FIG. 4, line 10 extends rectilinearly rearwardly through eyelet 30 and front and rear guide members 16 and 18.

Fishing line 10 is guided rearwardly through guide members 16, 18 along the top planar surface of diving plane 4. In the released position, diving plane 4 may slide along line 10 in the trolling direction, with line 10 sliding freely through the guide members 16,18.

A front upstanding tab 38 on the diving plane, for example of integrally molded plastic, is forward of jaws 22 and 24 and pivotally mounts latch arm 28, as at screw 40 extending through a looped portion 42 at the pivoted end of latch arm 28 and through tab 38. Tab 38 also guides line 10 rearwardly therethrough along passage 44 drilled or otherwise formed longitudinally forward-rearward through the base of tab 38 along the top planar surface of diving plane 4. Latch arm 28 has eyelet 30 at the end thereof opposite front tab 38. In the latched position, latch arm 28 is pivoted from tab 38 rearwardly and frictionally engaged and held by jaws 22 and 24 along a central portion 46 between the eyelet end at 30 and the pivotally mounted end 42. Arm 28 includes a line clamping portion 48 coacting in the latched position with line gripper means 20 between the base 50 of jaws 22 and 24 and the front tab 38 to clamp diving plane 4 to line 10. Upon release, arm 28 pivots forwardly to the released position, FIG. 4, unclamping gripper means 20 and line 10, the line extending freely through eyelet 30 on arm 28 then rearwardly through tab 38 and front guide member 16 and through jaws 22, 24 and rear guide member 18.

In the latched clamped position, the top outer surface of tubular member 20 is engaged by line clamping portion 48 of arm 28 to collapse tubular member 20 and press the bottom outer surface of tubular member 20 against the top of diving plane 4. This in turn causes the opposing inner surfaces of tubular member 20 to clamp and grip line 10 therebetween. Line 10 is thus gripped and clamped between the inner surfaces of a soft rubber tubular member 20 rather than being gripped between jaw members or the like such as 22 and 24. This provides extended line life because the line is not pulled away from such jaw type members in a ripping or frictionally releasing type manner. Instead, central portion 46 of latch arm 28 is gripped between jaws 22 and 24. Arm 28 is made of steel or the like, and thus not subject to damage or breakage from its frictional engagement with and release from jaws 22 and 24. In alternate species, tube 20 is eliminated, and line clamping portion 48 of arm 28 is the line gripper means or is provided with a rubber or the like wrapped therearound to grip line 10 and frictionally clamp it against the top of diving plane 4. Likewise in these species, line breakage is significantly reduced because the clamping function does not require that the line be ripped or pulled away from frictional jaws or the like upon the strike of the fish. Instead, latch arm 28 at portion 46 is subject to such frictional unclamping wear, thus saving the line from undergoing such stress. This substitution of latch arm portion 46 for line 10 in being subjected to the frictional clamping and unclamping wear and tear substantially diminishes line breakage.

A front bushing 52 with a rounded front outer edge 54 is provided in the front of front tab 38 at the base thereof along the top planar surface of diving plane 4 for guiding line 10 therethrough. A rear bushing 56 with a rounded rear outer edge 58 is provided in the rear end 18a along the top planar surface of diving plane 4 for guiding the line therethrough. This has been found to further reduce line breakage.

While the aforementioned fishing diver 2 has been advantageously designed in several areas to reduce stress on the fishing line 10, it has been found that the point of contact between the fishing line 10 and the inside surface of the eyelet 30 on latch arm 28 is so small in surface area 20 as to create a particularly susceptible contact point where line breakage is apt to occur.

In order to rectify this problem, FIGS. 5–9 illustrate a first alternative embodiment of fishing diver 2' which is similar in general structure and function to the fishing diver 2 described above except for a shielding arrangement 60 for protecting the line 10 as it passes through eyelet 30. In particular, arrangement 60 is embodied preferably in the form of an elongated, deformable coil spring 62 encircling the line 10 as the line extends upwardly and rearwardly of front tab 38, alongside central portion 46 of latch arm 28, through and against an inner, upper portion of eyelet 30, and then beyond eyelet 30 forwardly and upwardly for a predetermined distance. Spring 62 is retained on the lowermost end of latch arm central portion 46 by a resiliently collapsible tubular member 64 which tightly surrounds spring 62 and central portion 46. In the latched condition shown in FIGS. 5–7 and 9, spring sleeve 62 assumes a curved formation around eyelet 30 and line 10 is engaged with an inner surface of sleeve. In the released condition shown in FIG. 8, spring sleeve 62 assumes a straight formation such that a longitudinal axis of sleeve is substantially parallel to the top surface of the diving plane 4, and the line 10 is disengaged from sleeve 62. It should be understood that the inside surface of spring sleeve 62 defines an increased surface area for the line 10 in the vicinity of eyelet 30 so that line breakage is further minimized.

As seen in FIGS. 6,7 and 8, fishing diver 2' also differs from fishing diver 2 with respect to the base or bottom of diving plane 4. In contrast with the integral base 7 of diver 2, diver 2' has a diving plane 4' comprised of a base portion 66 removably joined to a top portion 68 such as by a removable fastener 70. The forward end of diving plane 4' includes a recess for accommodating a weight 72 which is selectively positionable to control the path of diver 2' as it moves through the water.

In the fishing divers 2, 2' shown in FIGS. 1–9, the diving planes 4, 4' are represented in a circular or cylindrical profile. However, it should be understood that the diving plane 4, 4' can also take different configurations such as a commercially available trolling ski or planer 4" illustrated in FIG. 10. Planer 4" has a rectangular profile having a ramped rudder portion 74 and a planar mounting portion 76 with the other components of the diver 2' secured in one corner area thereof. Although trolling planer 4" is shown with clamped and mounting portions 74, 76, respectively, facing upwardly, it is well known that in use planer 4" is adapted to float with its shorter dimension vertically disposed and to move in the direction of its longer dimension with the ramped and mounting surfaces facing the boat.

It is recognized that various alternatives and modifications are possible within the scope of the appended claims.

I claim:

1. In a fishing diver comprising a diving plane, guide means on said diving plane for guiding a fishing line along the plane of said diving plane through said guide means, one end of the line extending to a baiting lure and the other end of the line being reelable for trolling, and releasable latch means on said diving plane having a latched condition clamping said diving plane to the line such that upon trolling said diver dives downwardly at an angle to the line, said latch means having a released condition responsive to the strike of a fish on the lure unclamping said diving plane from the line and providing free sliding passage of the line through said guide means along the plane of said diving plane, said line through the guide means extending substantially parallel to said plane of said diving plane in said released condition of said latch means, said latch means including an eyelet guiding said other end of the line therethrough and then forwardly to said guide means, the improvement comprising:

an arrangement comprising a deformable sleeve disposed in the eyelet for surrounding the line and preventing the line from coming into contact with the eyelet as the line passes through the eyelet whereby to minimize breakage of the line thereat.

2. The improvement of claim 1, wherein said sleeve is defined by an elongated coil spring.

3. The improvement of claim 2, wherein, in said latched condition, the other end of the line is engaged against an inner surface of said spring, and in said released condition, the other end of the line is disengaged from the inner surface of said spring.

4. The improvement of claim 2, wherein one end of said spring is attached to said latch means.

5. The improvement of claim 1, wherein said diving plane has a circular profile.

6. The improvement of claim 1, wherein said diving plane has a rectangular profile.

7. The improvement of claim 1, wherein said diving plane is a trolling planer.

8. In a fishing diver comprising a diving plane, guiding means on said diving plane for guiding a fishing line, one end of the line extending to a baiting lure and the other end of the line being reelable for trolling or the like, and a releasable latch member on said diving plane having a latched condition frictionally engaged with latching means on said diving plane at a first portion of said latch member and clamping said diving plane to the line at a second portion of said latch member such that upon trolling said diver dives downwardly at an angle to the line, said latch member having a released condition responsive to the strike of a fish on the lure unclamping said first portion of said latch member from said latching means to unclamp said diving plane from said line at said second portion of said latch member and providing free sliding passage of the line through said guide means, said strike of said fish causing frictional unclamping of said first portion of said latch member such that said first portion of said latch member suffers frictional clamping and unclamping wear and tear, the improvement comprising:

a spring sleeve surrounding the other end of the line as the line passes through the eyelet, said spring sleeve runs upwardly and rearwardly along said first portion of said latch member, through and against a portion of said eyelet and then forwardly and upwardly for a predetermined distance relative to said eyelet.

9. The improvement of claim 8, wherein, in said latched condition, said spring sleeve assumes a curved formation around said eyelet and, in said released condition, said spring sleeve assumes a straight formation such that a longitudinal axis of said spring sleeve is substantially parallel to a top surface of said diving plane.

10. A fishing diver comprising:

a diving plane having a forward end and a rearward end;

guide means on said diving plane for guiding a fishing line, one end of the line extending to a baiting lure and the other end of the line being reelable for trolling, releasable latch means on said diving plane having a latched condition clamping said diving plane to the line such that upon trolling, said diver dives downwardly at an angle to the line, said latch means having a released condition responsive to the strike of a fish on the lure unclamping said diving plane to slide along the line in a trolling direction, said latch means including a pivoted latch arm, a front upstanding tab on said forward end of said diving plane pivotally mounting said latch arm and also guiding the line rearwardly through said tab, said latch arm having an eyelet at the end thereof opposite said front tab, the line extending through said eyelet then through said front tab; and a protective sleeve in the form of an elongated coil spring encircling the line and extending rearwardly of said front tab, and then through and beyond said eyelet such that an inside surface of said spring defines an increased surface area for the line in the vicinity of said eyelet whereby to minimize line breakage.

11. The fishing line of claim 10, wherein said spring extends alongside said latch arm in both said latched and released conditions.

12. The fishing diver of claim 10, wherein said latch means includes a pair of gripper jaws on the forward end of said diving plane.

13. The fishing diver of claim 12, wherein one end of the spring is secured to said latch arm at a point between said front tab and said gripper jaws.

14. The fishing diver of claim 13, wherein the one end of the spring is secured to said latch arm by a resiliently collapsible tubular member.

15. The fishing diver of claim 12, wherein said latch arm, in said latched condition, is pivoted rearwardly and frictionally held by said gripper jaws along a central portion of said latch arm between the eyelet end and the pivotable, mounted end.

16. The fishing diver of claim 12, wherein said latch arm includes a line clamping portion coacting in said latched condition with a line gripper means between a base of said gripper jaws and said front tab to clamp said diving plane to the line.

17. The fishing diver of claim 10, wherein said diving plane has a circular profile.

18. The fishing diver of claim 10, wherein said diving plane has a rectangular profile having a ramped portion and a planar mounted portion for mounting said latch means thereon.

19. The fishing diver of claim 10, wherein said diving plane is a trolling planer.

* * * * *